March 13, 1928.
R. BUSCH, SR
TRACTOR OPERATED WINCH
Filed Aug. 11, 1927
1,662,414
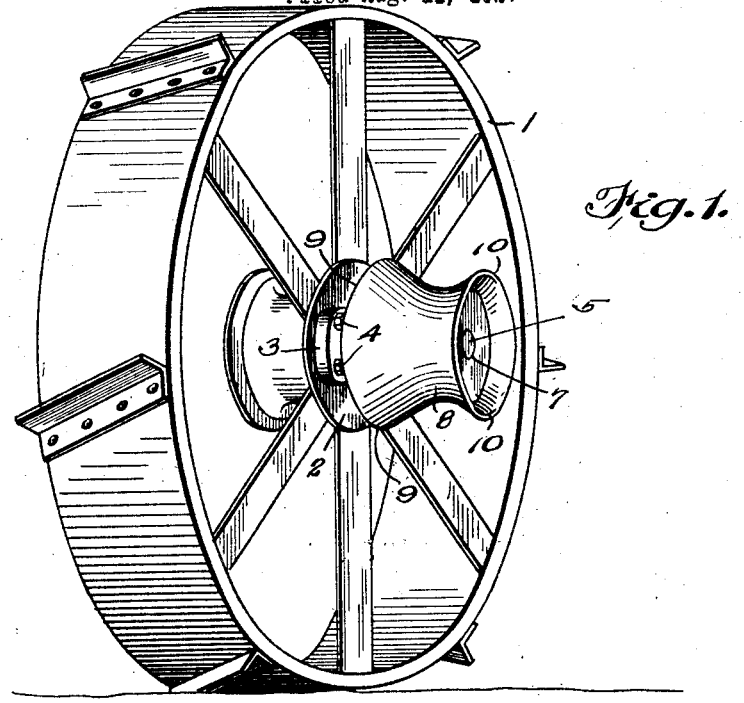
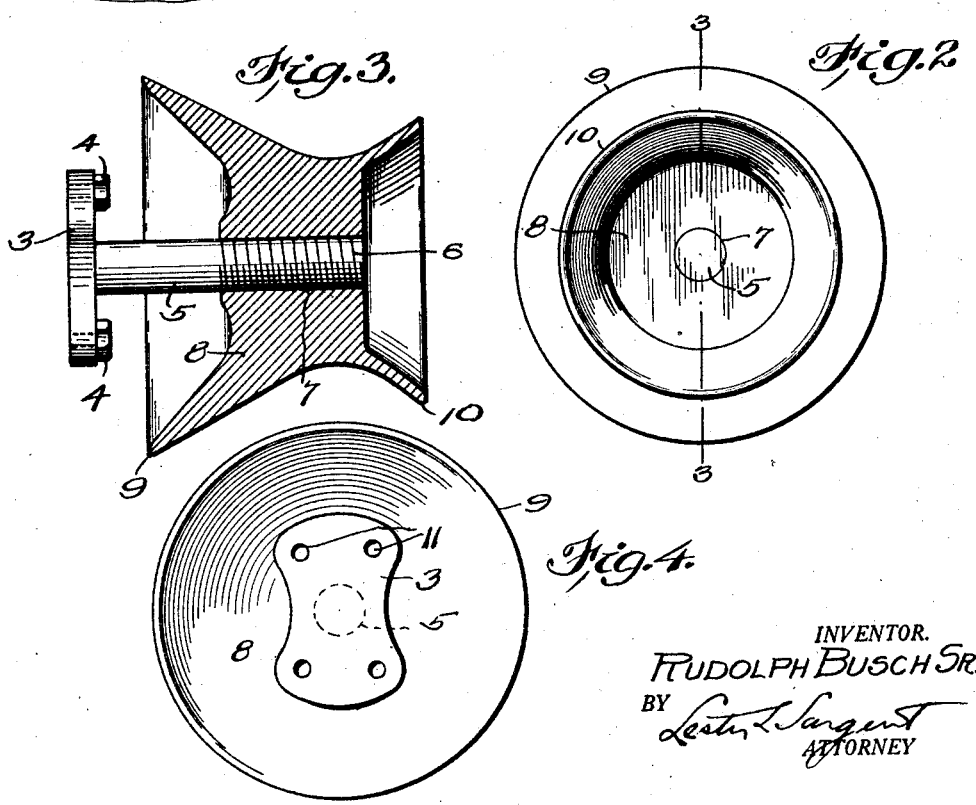
INVENTOR.
RUDOLPH BUSCH SR.
BY Lester L. Sargent
ATTORNEY Patented Mar. 13, 1928.

1,662,414

UNITED STATES PATENT OFFICE.

RUDOLPH BUSCH, SR., OF SHELLTOWN, MARYLAND.

TRACTOR-OPERATED WINCH.

Application filed August 11, 1927. Serial No. 212,342.

The object of my invention is to provide a novel and efficient winch adapted to be attached to a tractor and used for pulling and dragging objects such as hoisting hay into barns, pulling logs from swamps or any other work which a winch can do.

I attain these and other objects of my invention by the mechanism illustrated in the accompanying drawings, in which—

Figure 1 is a perspective view of my invention applied to a tractor wheel;

Fig. 2 is an end elevation of the outer end of the winch;

Fig. 3 is a longitudinal section through same; and

Fig. 4 is an end view of the inner end of the winch.

Like numerals indicate like parts in each of the several views.

Referring to the accompanying drawings, 1 indicates a conventional tractor wheel and 2 the hub of the tractor wheel. I provide a winch 8 having screw threaded center channel by means of which it is securely mounted on the threaded shaft 5 which carries a heavy flat plate or block 3 which is provided with a plurality of apertures 11 permitting of its being secured by suitable bolts 4 to the hub 2 of the tractor wheel. The winch has an outwardly expanding flange 10 and an opposite expanding flange 9 adjacent the hub of the tractor as shown in Fig. 1. These flanges are both annular flanges and flange 9 is of greater diameter than flange 10.

The cable or rope (not shown) is fastened to the winch in any suitable manner and also to the article which it is desired to move and the tractor is then started up thus operating the winch and winding the cable around it in the usual manner.

It is an especial object of my invention to provide a winch having the fewest practical number of parts and which also has an efficient, novel and exceedingly simple means of mounting it on the hub of the tractor wheel.

What I claim is—

1. In a device of the class described, the combination of a winch, the winch having opposite expanding flange edge portions, a threaded shaft extending through the center of the winch and on which it is mounted, a flat block affixed to the end of said shaft, said block having a plurality of apertures, and means for affixing said block securely to the hub of a tractor wheel.

2. In a device of the class described, the combination of a winch, the winch having opposite expanding flange edge portions, the flange adjacent the hub of the tractor wheel being of greater diameter than the outer expanding flange, a threaded shaft extending through the center of the winch and on which it is mounted, flat block affixed to the end of said shaft, said block having a plurality of apertures, and means for affixing said block securely to the hub of a tractor wheel.

RUDOLPH BUSCH, Sr.